May 10, 1966  S. J. HARPER  3,250,145
CONTROL MEANS FOR CHANGE SPEED GEARBOXES FOR MOTOR VEHICLES
Filed Oct. 4, 1963  2 Sheets-Sheet 1

INVENTOR
STEPHEN JAMES HARPER
BY- Mawhinney & Mawhinney
ATTYS

May 10, 1966  S. J. HARPER  3,250,145
CONTROL MEANS FOR CHANGE SPEED GEARBOXES FOR MOTOR VEHICLES
Filed Oct. 4, 1963  2 Sheets-Sheet 2
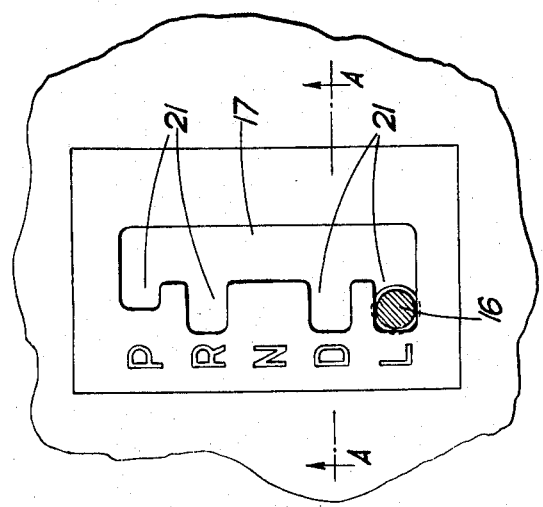
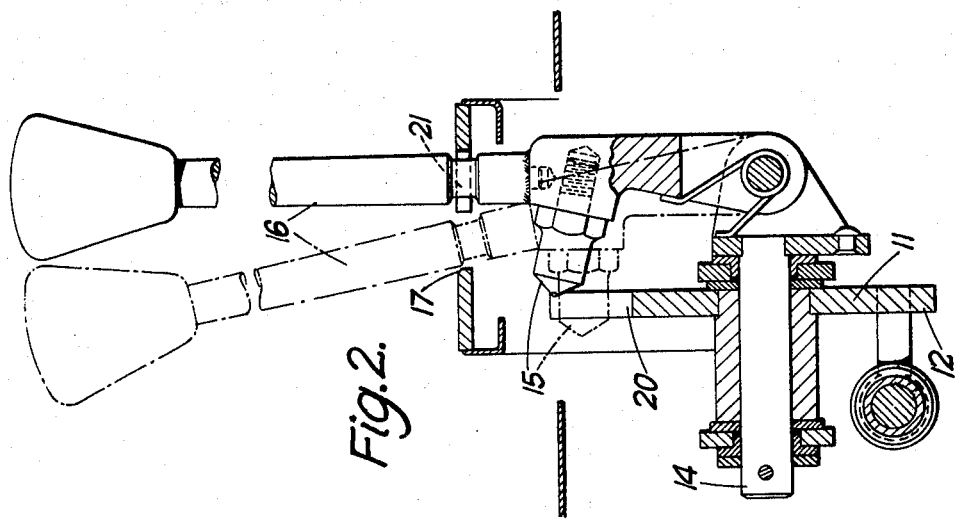
INVENTOR
STEPHEN JAMES HARPER
BY Mawkinney & Mawkinney
ATTYS.

United States Patent Office 3,250,145
Patented May 10, 1966

3,250,145
CONTROL MEANS FOR CHANGE SPEED GEARBOXES FOR MOTOR VEHICLES
Stephen James Harper, Stoke, Coventry, England, assignor to Humber Limited, Coventry, England, a British company
Filed Oct. 4, 1963, Ser. No. 314,042
Claims priority, application Great Britain, Oct. 5, 1962, 37,781
3 Claims. (Cl. 74—473)

The invention relates to control means for change speed gearboxes in motor vehicles of the kind having a gearbox resiliently supported from the vehicle body (e.g. on part of a resiliently supported engine and clutch and gearbox unit), a gear control lever attached to the body and a mechanical linkage between the lever and the gearbox. The invention is particularly but not exclusively concerned with the control of automatic gearboxes by means of a gear lever which moves to successive stations along a single slot or quadrant.

A difficulty which is found with vehicles of the above kind is that movements of the gearbox on its resilient support, tend to appear as movements or vibrations of the gear lever which is unpleasant for the driver or passengers. The invention seeks to reduce this difficulty, and, in the case of automatic transmissions where the gear selector handlever is restrained by gate means on the body, seeks to reduce the possibility of gear disengagement through movement of control linkage caused by engine-gearbox movement induced by braking, acceleration or torque reaction.

According to the present invention control means of the above kind are characterised in that the linkage aforesaid is normally discontinuous and is made continuous when operation by the lever is required.

Preferably the arrangement is such that continuity of the linkage is effected by an initial movement of the gear lever.

In a preferred construction according to the invention the lever has a releasable pin and socket connection with a member of the linkage by which the continuity of the linkage may be effected.

In one form of the invention the lever moves in a guide socket having notches in one side edge, there are spring means urging the lever laterally of the slot into the notches and the arrangement is that when the lever is in a notch the linkage is discontinuous and is made continuous as a result of movement of the lever out of the notch into the main slot. Where there is a pin and socket connection as aforesaid, the movement of the lever out of a notch may engage the pin in the socket.

Spring detent means may be provided to hold the linkage when it is disconnected from the lever.

A specific embodiment of the invention will now be described by way of example and with reference to the drawings accompanying the provisional specification, in which:

FIGURE 2 is a section on the line 2—2 in FIGURE 1, and FIGURE 3 is a plan view of the guide slot.

Figure 1:
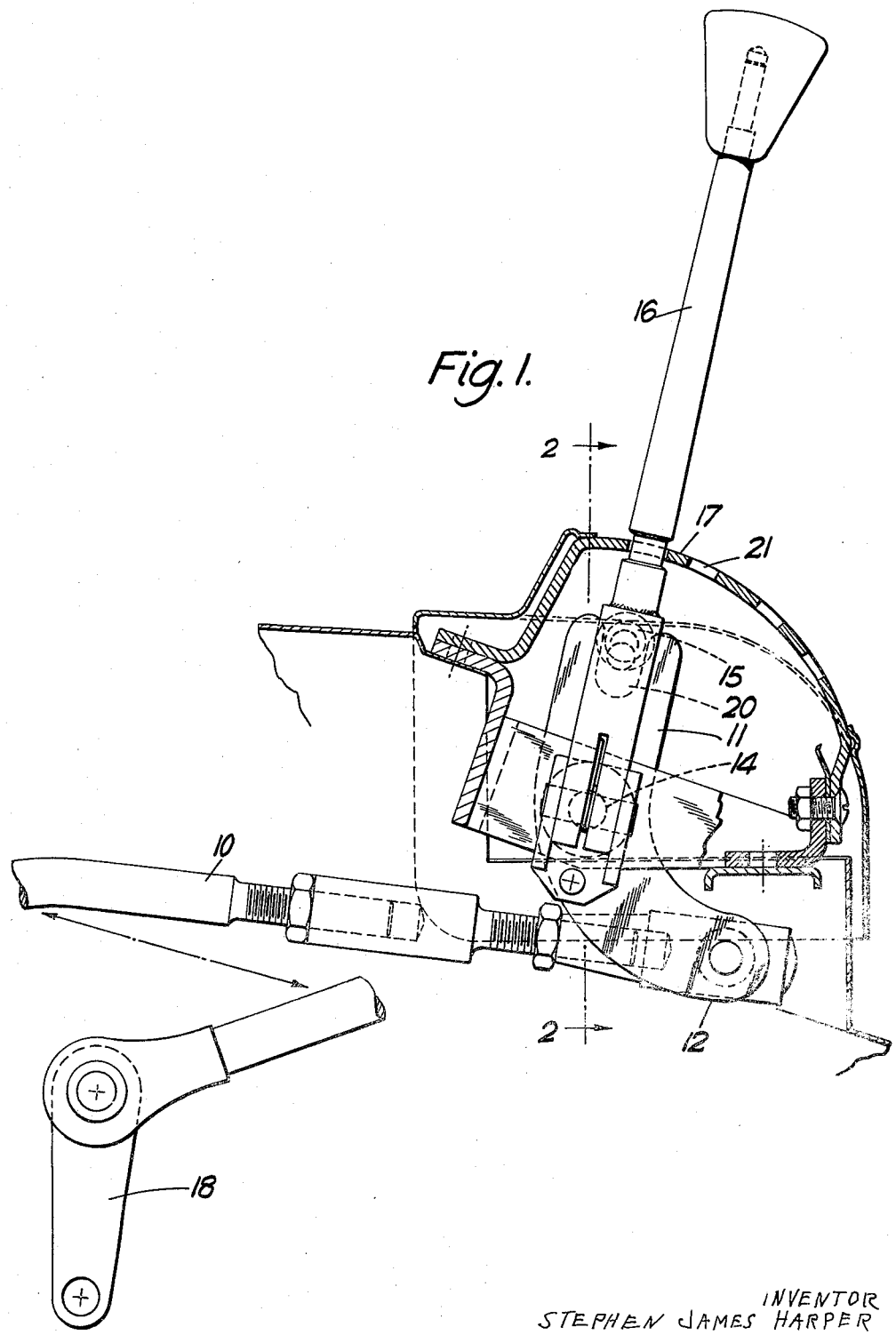
FIGURE 1 is an elevation of the remote gear change linkage.

The linkage comprises a rod 10 of which one end is coupled to a crank 11 by a ball joint 12 whose position is indicated dotted in FIGURE 2. The crank 11 is pivoted at 14, and has a slot 20 at the end opposite to the ball joint, which is engaged by a pin 15 on the gear lever 16 when the lever is moved to the position shown dotted in FIGURE 2. This movement carries the lever clear of the notches 21 in a guide slot 17 (FIGURE 3), and out into the slot 17 so that it may then be moved to a new position.

The lever 16 is spring loaded towards the notches so that it remains in the notch selected, and is disengaged from the crank 11. Thus the crank 11 is free to oscillate under loads applied through rod 10.

The other end of rod 10 is connected to arm 18 attached to the gearbox which is resiliently mounted from the body of the vehicle; arm 18 being held in the selected position by the resiliently mounted engine-gearbox unit, causes the slotted crank 11 to oscillate freely without movement of gear lever 16.

Misalignment of slot 20 relative to pin 15 under oscillation of the crank is catered for by provision of a rapidly tapering end to pin 15, the limits of misalignment being controlled by the diameter of pin 15.

The crank 14 and the gear lever 16 are both pivotally attached to the body.

I claim:
1. In a motor vehicle of the kind having a change speed gearbox resiliently supported on the vehicle body, a gear change lever movably attached to the body, and an operative mechanical connection between the lever and the gearbox for effecting gear changes on movement of the lever, the provision of releasable coupling means between the mechanical connection and the gear lever and resilient means to urge the gear lever out of connection with the mechanical connection.

2. In a motor vehicle of the kind having a change speed gearbox resiliently supported on the vehicle body, a gear change lever pivotally supported on the body and an operative mechanical connection between the lever and the gearbox for effecting gear changes by pivotal movement of the lever, the provision of releasable coupling means between the gearbox and the mechanical connection comprising:

(a) a lever arm forming a pivot of the mechanical connection supported on the body for pivotal movement about an axis co-axial with that of the pivotal movement of the gear change lever and arranged for movement alongside the gear lever, (b) a second pivotal mounting of the gear lever for movement about an axis transverse to the axis aforesaid for swinging movement of the gear lever towards and away from the lever arm, (c) resilient means urging the gear lever away from the lever arm, and (d) a pin and socket connection between the gear lever and the lever arm of which the pin is withdrawn from the socket when the gear lever is moved away from the lever.

3. In a motor vehicle of the kind having a change speed gearbox resiliently supported on the vehicle body, a gear change lever pivotally supported on the body and an operative mechanical connection between the lever and the gearbox for effecting gear changes by pivotal movement of the lever, the provision of releasable coupling means between the gear lever and the mechanical connection comprising (a) a lever arm forming a pivot of the mechanical connection supported on the body for pivotal movement about an axis co-axial with that of the pivotal movement of the gear change lever and arranged for movement alongside the gear lever, (b) a second pivotal mounting of the gear lever for movement about an axis transverse to the axis aforesaid for swinging movement of the gear lever towards and away from the lever arm, (c) resilient means urging the gear lever away from the lever arm, (d) a pin and socket connection between the gear lever and the lever arm of which the pin is withdrawn from the socket when the gear lever is moved away from the lever arm, (e) a guide slot attached to the body and arcuate about the pivotal attachment of the gear lever, which slides in the slot during the said pivotal movement, and
(f) a plurality of notches in one side edge of the slot, the arrangement being that the resilient means urges the gear lever to swing into a notch.

References Cited by the Examiner
UNITED STATES PATENTS 2,897,685  8/1959  Thannhauser _____ 74—473
2,983,160  5/1961  Hause _____ 74—473

MILTON KAUFMAN, *Primary Examiner.*